United States Patent
Pawlik et al.

(10) Patent No.: US 9,109,824 B2
(45) Date of Patent: Aug. 18, 2015

(54) EXPANSION VALVE WITH FORCE EQUALIZATION

(75) Inventors: Jens Pawlik, Broager (DK); Hans Kurt Petersen, Egtved (DK)

(73) Assignee: Danfoss A/S, Nordborg (DK)

( * ) Notice: Subject to any disclaimer, the term of this patent is extended or adjusted under 35 U.S.C. 154(b) by 502 days.

(21) Appl. No.: 13/062,089

(22) PCT Filed: Sep. 3, 2009

(86) PCT No.: PCT/DK2009/000197
§ 371 (c)(1),
(2), (4) Date: May 25, 2011

(87) PCT Pub. No.: WO2010/025727
PCT Pub. Date: Mar. 11, 2010

(65) Prior Publication Data
US 2011/0247359 A1    Oct. 13, 2011

(30) Foreign Application Priority Data

Sep. 5, 2008 (DK) ................................. 2008 01237
Jan. 13, 2009 (DK) ................................. 2009 00049

(51) Int. Cl.
| F25B 41/06 | (2006.01) |
| F16K 11/074 | (2006.01) |
| F16K 39/04 | (2006.01) |
| F25B 39/02 | (2006.01) |

(52) U.S. Cl.
CPC ............. *F25B 41/062* (2013.01); *F16K 11/074* (2013.01); *F16K 39/045* (2013.01); *F16K 39/04* (2013.01); *F25B 39/028* (2013.01); *F25B 2600/2511* (2013.01)

(58) Field of Classification Search
CPC ....... F25B 2341/067; F16K 1/18; F16K 3/08; F16K 3/10; F16K 11/074; F16K 39/04; F16K 39/045

USPC ............. 62/299, 525; 236/92 B, 92 R; 137/625.11, 625.13, 625.46; 251/175, 251/188
See application file for complete search history.

(56) References Cited

U.S. PATENT DOCUMENTS

| 3,967,782 | A | | 7/1976 | Eschbaugh et al. |
| 4,964,567 | A | * | 10/1990 | Heffner et al. ............. 236/92 B |
| 6,076,365 | A | * | 6/2000 | Benatav ........................ 62/160 |
| 6,164,331 | A | * | 12/2000 | Sugita et al. ............. 137/625.43 |
| 6,401,474 | B1 | * | 6/2002 | Wigglesworth et al. ..... 62/259.1 |
| 2007/0295016 | A1 | | 12/2007 | Robin |

FOREIGN PATENT DOCUMENTS

| DE | 102006006731 A1 | 8/2007 |
| JP | 200055510 A | 2/2000 |
| JP | 2007240058 A | 9/2007 |

OTHER PUBLICATIONS

International Search Report for PCT/DK2009/000197 dated Feb. 17, 2010.

\* cited by examiner

*Primary Examiner* — Jonathan Bradford
(74) *Attorney, Agent, or Firm* — McCormick, Paulding & Huber LLP

(57) ABSTRACT

An expansion valve having an inlet opening, at least one outlet opening and first and second valve parts. The inlet opening is adapted to receive fluid medium in a liquid state. The outlet opening(s) is/are adapted to deliver fluid medium in an at least partly gaseous state to a flow path. The valve parts are arranged movable relative to each other such that the mutual position of the valve parts determines a fluid flow between the inlet opening and the outlet opening(s). During normal operation, a resulting force acts upon the first valve part and/or the second valve part to press the first and second valve parts towards each other. The expansion valve having ability for reducing the resulting force acting upon the valve part(s). Thereby the valve parts can easier be moved relative to each other, and the force required in order to operate the valve is thereby reduced.

20 Claims, 10 Drawing Sheets

Fig. 3a
Fig. 3b
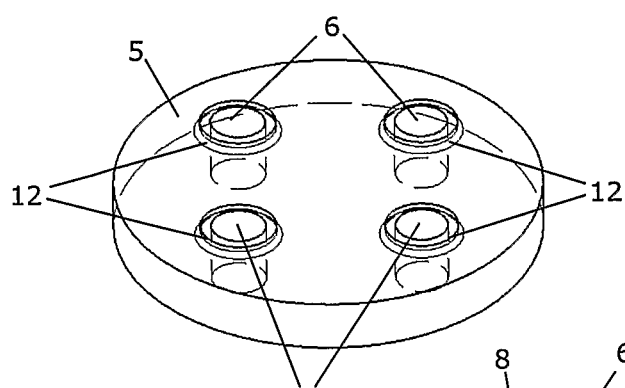
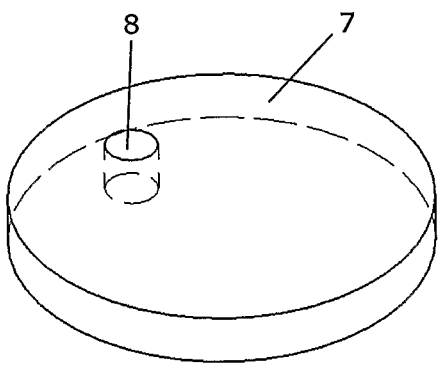
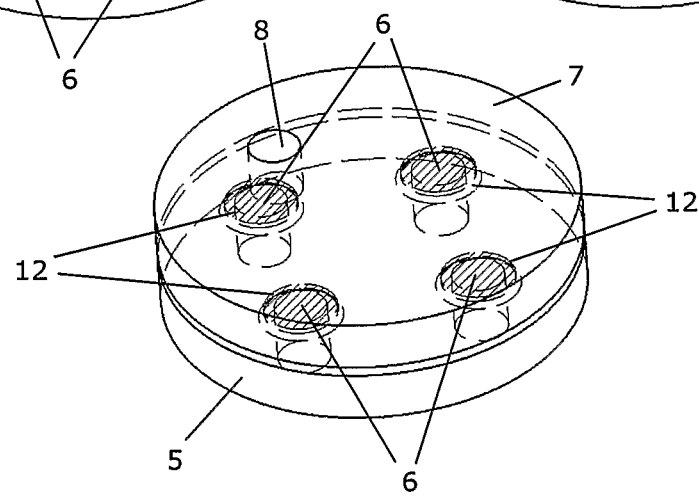
Fig. 3c

EXPANSION VALVE WITH FORCE EQUALIZATION

CROSS REFERENCE TO RELATED APPLICATIONS

This application is entitled to the benefit of and incorporates by reference essential subject matter disclosed in International Patent Application No. PCT/DK2009/000197 filed on Sep. 3, 2009, Danish Patent Application No. PA 2008 01237 filed on Sep. 5, 2008 and Danish Patent Application No. PA 2009 00049 filed on Jan. 13, 2009.

FIELD OF THE INVENTION

The present invention relates to an expansion valve, in particular for use in a refrigeration system. More particularly, the present invention relates to an expansion valve in which it is possible to reduce the forces required in order to operate the expansion valve.

BACKGROUND OF THE INVENTION

In expansion valves a first valve part, e.g. in the form of a valve seat, and a second valve part, e.g. in the form of a valve element, are normally arranged movably relative to each other, and relative movements of the valve parts define whether the valve is open or closed, and possibly an opening degree of the valve.

In some cases a differential pressure of an expansion valve will urge valve parts of the expansion valve towards each other. As a consequence, relative movements between the valve parts may be inhibited, e.g. due to friction between the valve parts.

In some fluid circuit, such as some refrigerant circuits of a refrigeration system, it is sometimes desirable to split the flow path into two or more parallel flow paths along part of the fluid circuit. This is, e.g., the case in refrigeration systems comprising two or more evaporators arranged in parallel. It may further be desirable to be able to control the fluid flow to each of the parallel flow paths, e.g. in such a manner that a substantially equal fluid distribution is obtained, or in such a manner that the system is operated in an optimum manner, e.g. in terms of energy consumption or efficiency.

SUMMARY OF THE INVENTION

It is an object of the invention to provide an expansion valve in which the forces required in order to operate the expansion valve can be reduced as compared to similar prior art expansion valves.

It is a further object of the invention to provide an expansion valve which provides a desired distribution of fluid medium among parallel flow paths without requiring excessive energy in order to operate the expansion valve.

According to a first aspect of the invention the above and other objects are fulfilled by providing an expansion valve comprising:
  an inlet opening adapted to receive fluid medium in a liquid state,
  at least one outlet opening adapted to deliver fluid medium in an at least partly gaseous state to at least one flow path,
  a first valve part and a second valve part arranged movable relative to each other in such a manner that the mutual position of the first valve part and the second valve part determines a fluid flow between the inlet opening and each of the outlet opening(s), said first and second valve parts being arranged in such a manner that, during normal operation, a resulting force acts upon the first valve part and/or the second valve part, said force pressing the first and second valve parts towards each other, and
  means for reducing the resulting force acting upon the valve part(s).

The inlet opening is adapted to receive fluid medium. Thus, the inlet opening is preferably fluidly connected to a source of fluid medium.

The expansion valve of the invention defines at least one flow path between the inlet opening and the at least one outlet opening. Fluid medium in a liquid state is received at the inlet opening and fluid medium in an at least partly gaseous state is delivered at the outlet opening(s). In the present context the term 'liquid state' should be interpreted to mean that the fluid medium entering the expansion valve via the inlet opening is substantially in a liquid phase. Similarly, in the present context the term 'at least partly gaseous state' should be interpreted to mean that the fluid medium leaving the expansion valve via the outlet opening(s) is completely in a gaseous phase, or at least a part, e.g. a substantial part, of the volume of the fluid medium leaving the expansion valve is in a gaseous phase. Accordingly, at least a part of the fluid medium entering the expansion valve undergoes a phase transition from the liquid phase to the gaseous phase when passing through the expansion valve.

The inlet opening and the outlet opening(s) may preferably be fluidly connected to one or more other components, such as other components of a refrigeration system. The expansion valve may advantageously form part of a flow system, such as a flow circuit. In this case the fluid medium may advantageously be a suitable refrigerant, such as a refrigerant selected from one of the following groups of refrigerants: HFC, HCFC, CFC or HC. Another suitable refrigerant is $CO_2$.

The expansion valve further comprises a first valve part and a second valve part. The valve parts are arranged movably relative to each other. This may be achieved by mounting the first and/or the second valve part in a manner which allows it/them to move relative to the remaining parts of the expansion valve. Thus, the first valve part may be movable while the second valve part is mounted in a fixed manner. As an alternative, the second valve part may be movable while the first valve part is mounted in a fixed manner. Finally, both of the valve parts may be movably mounted. In all of the situations described above a relative movement between the first valve part and the second valve is possible, thereby defining a mutual position of the first valve part and the second valve part. This mutual position determines a fluid flow between the inlet opening and each of the outlet opening(s). Thus, a desired fluid flow can be obtained by adjusting the mutual position of the valve parts. This will be described in further detail below.

The first and second valve parts are arranged in such a manner that, during normal operation, a resulting force acts upon the first valve part and/or the second valve part. In the present context the term 'during normal operation' should be interpreted to mean during circumstances which are expected to occur when the expansion valve is used as intended by the manufacturer, including expected pressure ranges, expected flow rates, using expected fluid mediums, etc. For instance, 'normal operation' should not be interpreted to cover situations where the expansion valve does not receive fluid medium, e.g. because it does not form part of a flow system, or situations where the valve elements are subjected to pressures which are well outside expected pressure ranges.

The resulting force presses the first and second valve parts towards each other. The resulting force may be a combination of forces acting purely upon the first valve part, or it may be a combination of forces acting purely upon the second valve part. Alternatively, it may be a combination of forces acting upon the first valve part and forces acting upon the second valve part. The individual forces may act in any direction as along as the resulting force presses the valve parts towards each other. Thus, in any event, the resulting force is directed in such a manner that the first valve part and the second valve part are pressed towards or against each other. Thereby it can be ensured that the expansion valve is tight. However, pressing the valve parts towards each other during normal operation makes it difficult to move the valve parts relative to each other, e.g. due to friction between the valve parts and/or due to a normal force originating from a differential pressure acting upon the valve parts. Accordingly, relatively large forces are required in order to perform the mutual movements between valve parts which are required in order to operate the expansion valve in an appropriate manner.

The expansion valve further comprises means for reducing the resulting force acting upon the valve parts. Thereby the problems described above are reduced, and the forces required in order to obtain a desired mutual movement between the valve parts can thereby be reduced as compared to prior art expansion valves. Thus, the expansion valve according to the present invention can be operated without requiring excessive energy. This is an advantage.

The means for reducing the resulting force may comprise means for biasing the first valve part and the second valve part in a direction away from each other. According to this embodiment a biasing force is applied to the first valve part and/or the second valve part in such a manner that the biasing force counteracts the resulting force, thereby reducing it.

The biasing means may, in this case, comprise means for adjusting at least one pressure occurring at or near the first valve part and/or the second valve part. This may, e.g., be obtained by providing the first valve part and/or the second valve part with at least one bypass opening allowing adaptation of a first pressure at a first side of the first/second valve part to a second pressure at a second side of the first/second valve part. According to this embodiment a pressure equalization takes place between either side of the relevant valve part, thereby reducing the differential pressure acting upon the valve parts, and thereby reducing the resulting force. As an alternative the at least one pressure may be adjusted by applying a pressure by means of an external source.

The expansion valve may further comprise an actuator adapted to cause relative movements of the first valve part and the second valve part, and the biasing means may be operationally connected to the actuator in such a manner that the first valve part and the second valve part are biased in a direction away from each other in response to actuation of the actuator. According to this embodiment the valve parts are only biased away from each other during mutual movements between the valve parts. This is exactly the situation where it is desirable to reduce the resulting force in order to minimise the force required to operate the expansion valve. Simultaneously, the valve parts are pressed towards each other by the resulting force when the valve parts are not performing mutual movements, and thereby it can be ensured that the expansion valve is as tight as possible. The biasing means may, in accordance with this embodiment, comprise a pilot valve which is arranged to be opened in response to actuation of the actuator.

Alternatively or additionally, the biasing means may comprise one or more spring members, e.g. in the form of one or more compressible springs arranged to pull or push the valve elements in a direction away from each other.

The means for reducing the resulting force may be at least partly integrated in the first valve part and/or the second valve part. This may, e.g., be obtained by providing the first valve part and/or the second valve part with one or more recesses and/or one or more projections, thereby reducing a contact area between the first valve part and the second valve part. Reducing the contact area between the valve parts in this manner reduces the area upon which a differential pressure acts, and thereby the resulting force pressing the valve parts towards each other is also reduced. A reduction of the contact area may be obtained by removing part of a surface of a valve part, the surface being adapted to face a surface of the other valve part. In this case the means for reducing the resulting force is in the form of one or more recesses formed in said valve part, and the contact area is defined by the area of the remaining part of the surface. Alternatively or additionally, a reduction of the contact area may be obtained by adding material to a part of a surface of a valve part, thereby providing one or more projections on said surface. The contact area between the valve parts is, in this case, defined by the area of the projections.

The first valve part and the second valve part may be adapted to perform substantially linear movements relative to each other. According to this embodiment, the valve parts may be arranged slidingly relative to each other, e.g. one of the valve parts being a tube having the other valve part arranged slidingly inside.

Alternatively, the first valve part and the second valve part may be adapted to perform substantially rotational relative movements. According to this embodiment, one of the valve parts may be a tube having the other valve part arranged inside in such a manner that mutual rotational movements about a common longitudinal axis can be performed. As an advantageous alternative, the first valve part may comprise a first disk having at least one opening formed therein, and the second valve part may comprise a second disk having at least one opening formed therein, the first disk and/or the second disk being arranged to perform rotational movements relative to the other disk, and the opening(s) of the first disk and the opening(s) of the second disk may be arranged in such a manner that openings of the first disk and the second disk can be arranged at least partly overlappingly, and each of the openings of the first disk may be fluidly connected to an outlet opening.

The number of openings formed in the second disk may be equal to the number of openings formed in the first disk. In this case the expansion valve is preferably of a kind in which the mutual position of the valve parts determines an opening degree of the expansion valve. This will be described further below.

Alternatively, the second disk may have only one opening formed therein. In this case the expansion valve is preferably of a kind in which the mutual position of the valve parts determines a distribution of fluid among the outlet openings. This will be described further below.

As other alternatives, both of the disks may be provided with only one opening, or the disks may be provided with different numbers of openings, both of the disks having at least two openings formed therein.

At least one of the opening(s) of the first disk and/or the opening(s) of the second disk may have a tapered shape defining a smaller size along a circumferential direction at an end facing towards the centre of the first/second disk than a size along a circumferential direction at an end facing towards the periphery of the first/second disk. In the case that a number of openings are arranged circumferentially on one of the disks, the tapered shape allows the openings to be arranged closer to each other than openings covering the same area, but having a substantially circular shape. The tapered shape further ensures that a sufficient area is present between the openings to define closed positions of the expansion valves, i.e. positions where there is no overlap between openings of the first disk and openings of the second disk.

This allows the openings to be moved towards the centre of the disk, i.e. to a position where the circumference defined by the openings is smaller, without reducing the area of the openings, and without compromising the possibility of defining a closed state for the expansion valve.

Moving the openings towards the centre of the disk causes the torque required in order to rotate the disks relative to each other to be reduced, because the torque is dependent on the distance between the axis of rotation for the relative movement between the disks and the position of the openings. This will be explained in further detail below with reference to the drawings. Consequently, providing the openings with tapered shapes makes it possible to design the expansion valve in such a manner that the torque required for operating the expansion valve can be minimised. In this case the design of the openings, e.g. in terms of shape and/or position on the disks, may be regarded as forming part of the means for reducing the resulting force acting upon the valve parts.

Finally, replacing substantially circular openings with openings having a tapered shape will change the opening characteristics of the expansion valve. Accordingly, the tapered openings can be designed in such a manner that desired opening characteristics are obtained.

The expansion valve may further comprise an actuator adapted to cause relative movements of the first valve part and the second valve part. The actuator may, e.g., be of a kind comprising a thermostatic valve. Alternatively, the relative movements of the valve parts may be driven by a step motor, a solenoid, or any other suitable means.

The expansion valve may further comprise:
 a distributor comprising an inlet part fluidly connected to the inlet opening, the distributor being arranged to distribute fluid medium received from the inlet opening to at least two parallel flow paths, and
 at least two outlet openings, each being adapted to deliver fluid medium in an at least partly gaseous state, each of the outlet openings being fluidly connected to one of the parallel flow paths.

In this case the expansion valve is capable of providing a desired distribution of fluid medium among parallel flow paths without requiring excessive energy in order to operate the expansion valve.

According to this embodiment, the expansion valve comprises a distributor arranged to distribute fluid medium received from the inlet opening to at least two parallel flow paths. The flow paths are parallel in the sense that fluid can flow along the flow paths in a parallel manner, i.e. they are arranged fluidly in parallel. Each of the flow paths is fluidly connected to one of the outlet openings, i.e. fluid medium entering a given flow path leaves the expansion valve via a given, corresponding outlet opening. Accordingly, the distributor ensures that the fluid medium received at the inlet opening is distributed among the outlet openings in a predetermined and desired manner.

The first valve part and/or the second valve part may form part of the distributor. According to this embodiment the distribution of fluid medium takes place during expansion of the fluid medium. This is an advantage because it can thereby be obtained that the fluid medium is distributed while at least a substantial part of it is in the liquid phase. This makes it easier to control the distribution. Furthermore, it makes the expansion valve suitable for use in flow systems of the microchannel type.

The mutual position of the first valve part and the second valve part may determine a distribution of fluid among the outlet openings. According to this embodiment, the second valve part may advantageously comprise only one opening. When relative movements of the first valve part and the second valve part are performed the opening of the second valve part can then be moved alternatingly between positions where it overlaps with the openings of the first valve part. When the opening of the second valve part is positioned overlappingly with a given opening of the first valve part, fluid medium is delivered to the flow path corresponding to this opening, but not to the flow paths corresponding to the other opening(s) of the first valve part. Thereby the amount of fluid medium which is delivered to each of the flow paths can be controlled by controlling the time during which the opening of the second valve part is arranged overlappingly with each of the openings of the first valve part. Thereby the distribution of fluid medium among the flow paths can be controlled.

At least some of the openings may be microchannels.

Alternatively, the mutual position of the first valve part and the second valve part may determine an opening degree of the expansion valve. According to this embodiment the opening degree of the expansion valve, and thereby the amount of fluid medium allowed to pass the expansion valve, can be adjusted by adjusting the mutual position of the first valve part and the second valve part, and thereby the mutual position of the openings.

The openings of the first valve part and the opening(s) of the second valve part may be arranged in such a manner that opening(s) of the first valve part and opening(s) of the second valve part can be arranged at least partly overlappingly in response to a mutual movement of the first valve part and the second valve part. The openings may each be fluidly connected to an outlet opening, and the mutual position of the valve parts may define (an) opening degree(s) of the valve assembly towards the outlet opening(s).

When performing mutual movements between the first valve part and the second valve part, the mutual positions of the openings formed in the two valve parts is changed. Thus, the overlap between a given opening of the first valve part and a given opening of the second valve part is determined by the mutual position of the first valve part and the second valve part. The larger the overlap, the larger a resulting opening defined by the two openings must be expected to be. This resulting opening may advantageously define the opening degree of the expansion valve towards the corresponding outlet opening. According to this embodiment the number of openings of the first valve part may advantageously be equal to the number of openings of the second valve part, and the openings are preferably positioned in such a manner that pairs of corresponding openings in the first and second valve part are defined. The degree of overlap between each pair of openings is preferably substantially the same.

A correspondence between opening degree of the expansion valve and mutual position of the first valve part and the second valve part may alternatively or additionally be defined by a geometry of the first valve part and/or a geometry of the second valve part. Such a geometry may be or comprise size and/or shapes of openings defined in the first and/or second valve part, size and/or shape of valve elements/valve seats formed on the first and/or second valve parts, and/or any other suitable geometry.

The fluid medium may advantageously be a refrigerant. In this case the expansion valve is preferably arranged in a refrigerant circuit of a refrigeration system.

According to a second aspect of the invention the above and other objects are fulfilled by providing a refrigeration system comprising:
- at least one compressor,
- at least one condenser,
- at least one evaporator, and
- an expansion valve according to the first aspect of the invention, said expansion valve being arranged in such a manner that the outlet opening is arranged to deliver refrigerant to the evaporator.

It should be noted that a person skilled in the art would readily recognise that any feature described in combination with the first aspect of the invention could also be combined with the second aspect of the invention and vice versa.

The refrigeration system may comprise only one compressor. Alternatively it may comprise two or more compressors, e.g. arranged in a compressor rack.

The refrigeration system may be an air condition system. Alternatively, it may be a refrigeration system of the kind used in cooling furniture or freezers in a supermarket.

The invention further relates to a refrigeration system comprising:
- at least one compressor,
- at least one condenser,
- at least two evaporators arranged in parallel along a refrigerant flow path of the refrigeration system, and
- an expansion valve according to the first aspect of the invention, said expansion valve being arranged in such a manner that each of the at least two outlet openings is arranged to deliver refrigerant to one of the evaporators.

BRIEF DESCRIPTION OF THE DRAWINGS

The invention will now be described in further detail with reference to the accompanying drawings in which FIGS. 3a-3c illustrate valve parts of an expansion valve according to a first embodiment of the invention.

DETAILED DESCRIPTION

Figure 1:
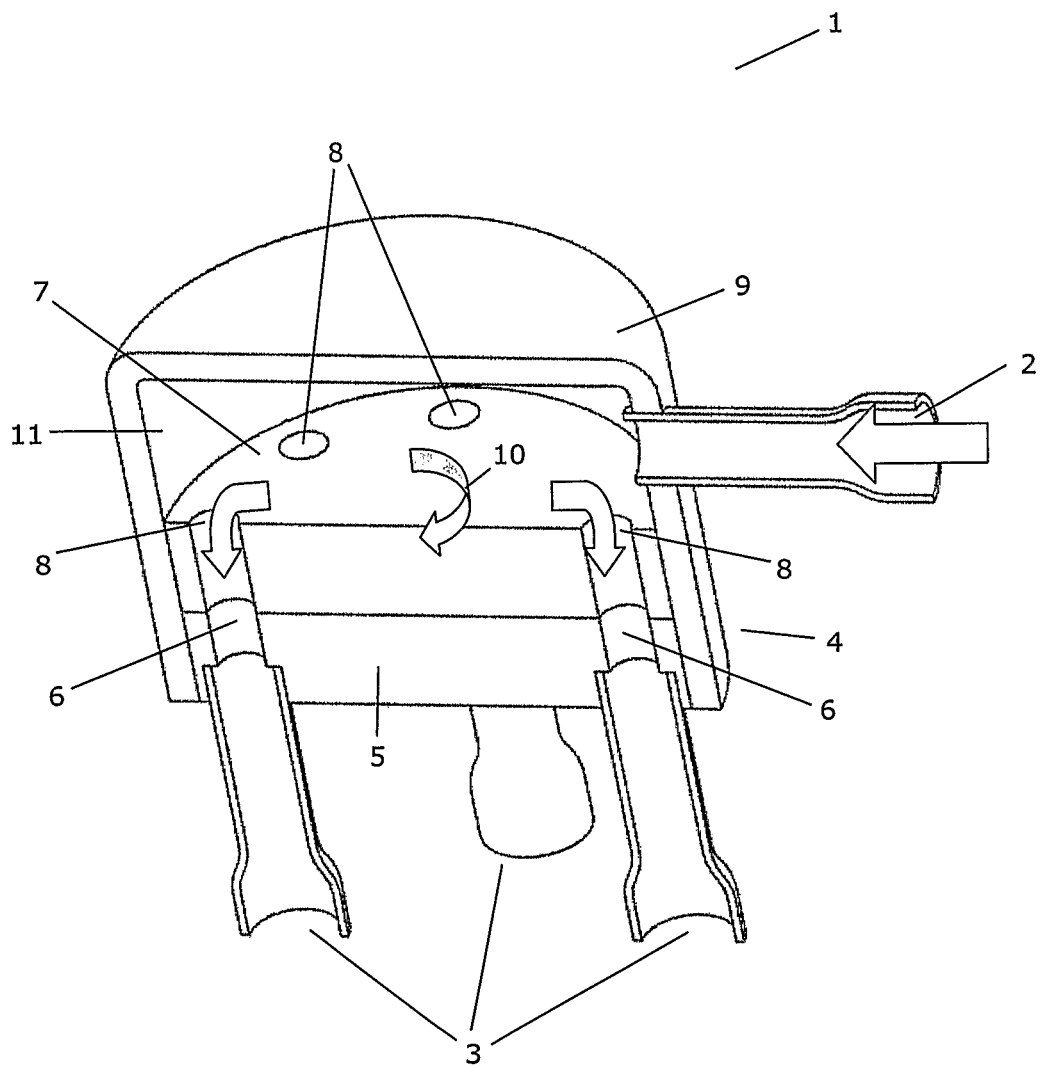
FIG. 1 is a perspective view of a cut through an expansion valve according to an embodiment of the invention.

FIG. 1 is a perspective view of a cut through an expansion valve 1 according to an embodiment of the invention. The expansion valve 1 comprises an inlet opening 2 adapted to receive fluid medium in a liquid state. Thus, the inlet opening 2 is connectable to a source of fluid medium in a liquid state. The expansion valve 1 further comprises four outlet openings 3, three of which are visible, the outlet openings 3 being arranged fluidly in parallel.

The expansion valve 1 further comprises a distributor 4 comprising an orifice disk 5 being provided with four openings 6, two of which are visible, and a distributor disk 7 being provided with six openings 8, four of which are visible. The orifice disk 5 is mounted fixedly relative to the outlet openings 3, and each of the openings 6 is arranged at a position corresponding to an outlet opening 3. The distributor disk 7 is arranged rotatably relative to the orifice disk 5 and to a housing 9 of the expansion valve 1, as indicated by arrow 10. Thereby the openings 8 provided in the distributor disk 7 are angularly movable relative to the openings 6 provided in the orifice disk 5, and the mutual angular position of the orifice disk 5 and the distributor disk 7 defines mutual overlaps between the openings 6, 8. In FIG. 1 the distributor disk 7 is arranged in an angular position in which four of the openings 8 of the distributor disk 7 overlap completely with the four openings 6 of the orifice disk 5. Accordingly, the opening degree of the expansion valve 1 is the largest possible, i.e. fluid medium is allowed to flow from the inlet opening 2, via volume 11 defined between the housing 9 and the distributor disk 7, to each of the outlet openings 3 to the largest possible extent.

As an alternative, the distributor disk 7 could be of a kind comprising only a single opening 8. In this case the mutual angular position of the distributor disk 7 and the orifice disk 5 determines the position of this opening 8 relative to the openings 6 of the orifice disk 5. The opening 8 may be moved between positions where it overlaps with openings 6, one by one, thereby alternatingly allowing fluid medium to be supplied to each of the outlet openings 3. The amount of fluid supplied to a given outlet opening 3 is, in this case, determined by the amount of time the opening 8 is arranged at a position overlapping with the position of an opening 6 corresponding to the given outlet opening 3. Thereby the distribution of fluid medium among the outlet openings 3 can be controlled by controlling the movement pattern of the distributor disk 5.

Figure 2A:
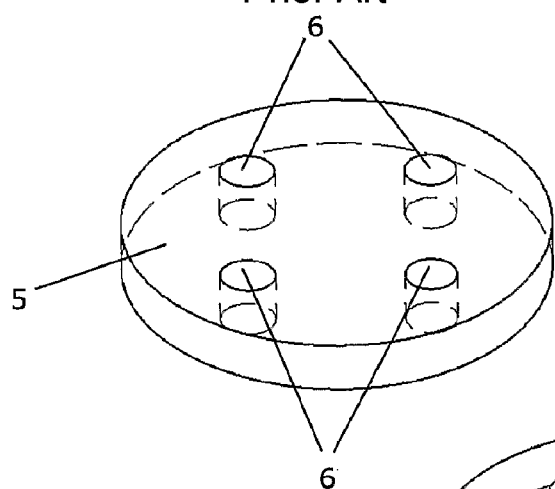
FIGS. 2a-2c illustrate valve parts of a prior art expansion valve.

FIG. 2a shows an orifice disk 5 for use in a distributor for an expansion valve similar to the one shown in FIG. 1. The orifice disk 5 is provided with four openings 6.

Figure 2B:
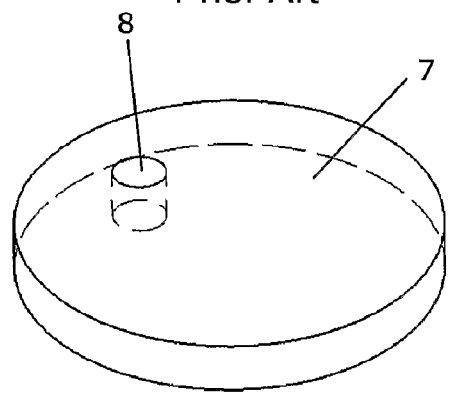

FIG. 2b shows a distributor disk 7 matching the orifice disk of FIG. 2a. The distributor disk 7 is provided with a single opening 8.

Figure 2C:
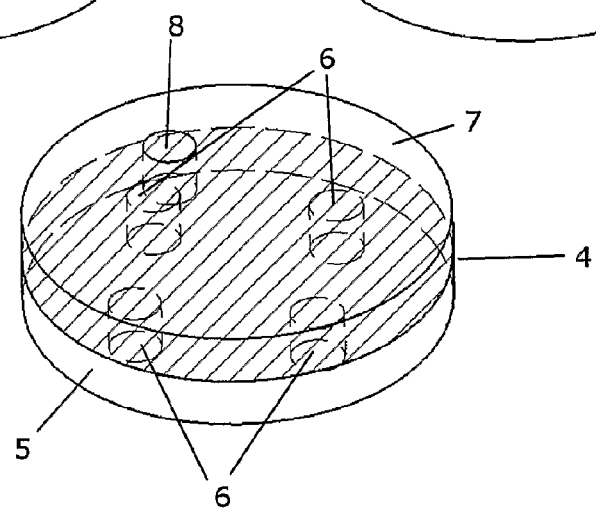

FIG. 2c shows a prior art distributor 4 formed by the orifice disk 5 of FIG. 2a and the distributor disk 7 of FIG. 2b. The disks 5, 7 are arranged adjacent to each other in such a manner that mutual rotational movements between the disks 5, 7 are possible. Thereby the opening 8 of the distributor disk 7 can be moved into positions where it overlaps with one of the openings 6 of the orifice disk 5. Accordingly, the distributor 4 of FIG. 2c is not of the kind shown in FIG. 1, but of the alternative kind described above with reference to FIG. 1.

The orifice disk 5 is provided with a substantially planar surface which is arranged to face a similar substantially planar surface of the distributor disk 7. The planar surfaces define a contact area between the disks 5, 7 which essentially covers the disks 5, 7. The extent of the contact area is illustrated by the hatched region.

Since the distributor 4 forms part of an expansion valve, the disks 5, 7 will be exposed to a differential pressure which pushes the disks 5, 7 towards each other, thereby defining a normal force acting upon the disks 5, 7. The magnitude of the normal force depends on the level of the differential pressure and on the design of the disks 5, 7. The magnitude of the normal force and the friction factor between the disks 5, 7 determines the torque required to perform mutual angular movements of the disks 5, 7. Since the contact area of the disks 5, 7 shown in FIG. 2c essentially covers the disks 5, 7, substantially the entire surface of each disk will be subjected to the differential pressure. The normal force applied to the disks 5, 7 is the contact area multiplied by the differential pressure, and it is therefore very large in the distributor shown in FIG. 2c. As a consequence the torque required to perform mutual angular movements between the disks 5, 7 is also very large.

It should be noted that the disks 5, 7, apart from forming a distributor 4, also form valve elements of the expansion valve.

FIG. 3a shows an orifice disk 5 similar to the one shown in FIG. 2a. However, the orifice disk 5 of FIG. 3a is provided with protrusions 12 arranged around each of the openings 6.

FIG. 3b shows a distributor disk 7 identical to the one shown in FIG. 2b.

FIG. 3c shows a distributor 4 according to a first embodiment of the invention, formed by the orifice disk 5 of FIG. 3a and the distributor disk 7 of FIG. 3b. Similarly to the distributor 4 of FIG. 2c the disks 5, 7 are arranged in such a manner that relative angular movements between the disks 5, 7 can be performed. It is clear from FIG. 3c that the protrusions 12 formed on the orifice disk 5 has the consequence that the disks 5, 7 are only abutting each other in regions corresponding to the positions of the protrusions 12. Thereby the contact area, illustrated by the hatched areas, between the orifice disk 5 and the distributor disk 7 is considerably reduced as compared to the situation shown in FIG. 2c. As a consequence the normal force applied to the disks 5, 7 is considerably reduced, and torque required in order to perform mutual angular movements can be reduced correspondingly.

Furthermore, since the protrusions 12 are arranged around each of the openings 6 of the orifice disk 5, the protrusions 12 provide a sealing effect in the sense that they substantially prevent fluid medium flowing through the openings 6, 8 from leaving a flow channel defined by openings 6, 8 arranged overlappingly. Thereby a substantially tight expansion valve is provided.

Figure 4:
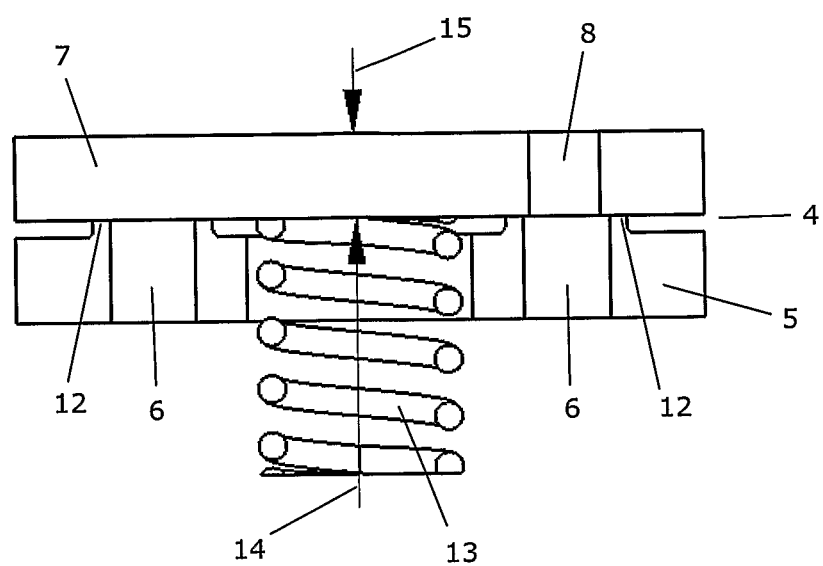
FIG. 4 illustrates a distributor of an expansion valve according to a second embodiment of the invention.

FIG. 4 is a cross sectional view of a distributor 4 for an expansion valve according to a second embodiment of the invention. The distributor 4 comprises an orifice disk 5 comprising four openings 6, two of which are visible, and a distributor disk 7 comprising one opening 8. The orifice disk 5 is provided with protrusions 12 arranged about each of the openings 6. Accordingly, the distributor 4 of FIG. 4 is very similar to the distributor 4 of FIG. 3c.

However, the distributor 4 of FIG. 4 comprises a compression spring 13 arranged in such a manner that it pushes the disks 5, 7 away from each other, i.e. in such a manner that the spring force counteracts the normal force originating from the differential pressure. The spring force is illustrated by arrow 14. Thus, the resulting force acting upon the disks 5, 7 is smaller than the normal force. This corresponds to reducing the normal force, and the torque required for performing mutual angular movements of the disks 5, 7 is thereby reduced. The resulting force is illustrated by arrow 15. Since the spring 13 provides a static counter force a static equalization of the normal force is thereby obtained.

It is clear from FIG. 4 that the protrusions 12 provide a sealing effect as described above. It should be noted that the differential pressure over the expansion valve is expected to vary during normal operation, since it depends on the specific load on the application. It is therefore not possible to design the compression spring 13 in such a manner that full equalization, i.e. the spring force exactly balances the normal force, is obtained at any time. In order to ensure that the expansion valve is tight it is therefore necessary to design the compression spring 13 in such a manner that the spring force is smaller than an expected minimal normal force. Therefore it is only possible to obtain a limited degree of equalization using static equalization.

Figure 5:
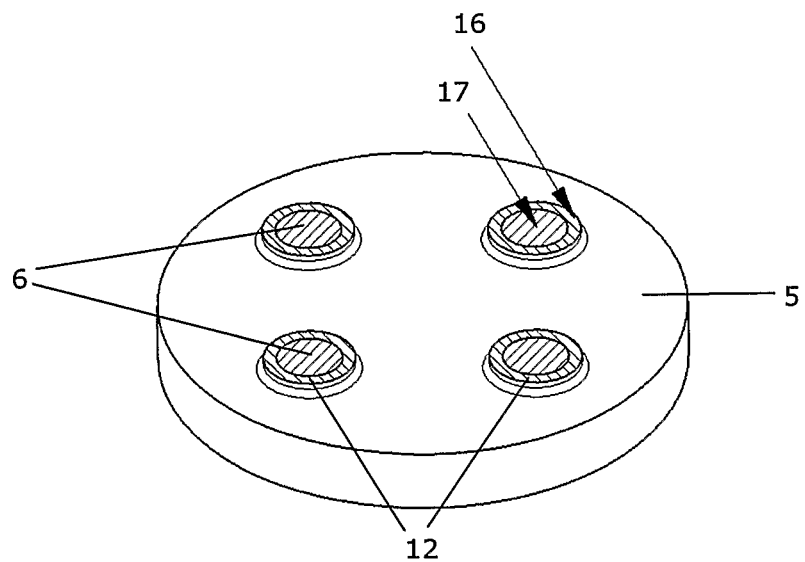
FIG. 5 illustrates a valve part having sealing areas.

FIG. 5 is a perspective view of the orifice disk 5 of FIG. 3a. In FIG. 5 a sealing area 16 and an orifice area 17 of each opening 6 is marked. The sealing area 16 has a direct influence on the closing force of the valve.

Figure 6:
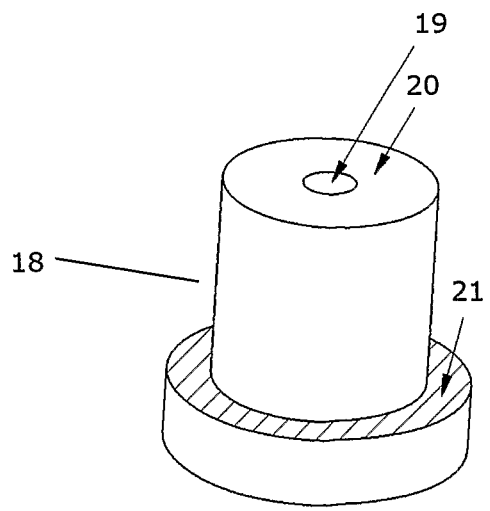
FIG. 6 shows an equalizing element for an expansion valve according to an embodiment of the invention.

FIG. 6 is a perspective view of a piston 18 for use in an expansion valve according to an embodiment of the invention. The piston 18 is provided with an equalizing channel 19 arranged to allow a flow of fluid medium to pass through the piston 18 with the purpose of providing equalization of pressures on opposite sides of the piston 18. This will be explained in further detail below with reference to FIGS. 7 and 8.

The piston 18 is further provided with a contact area 20 adapted to be arranged in contact with a distributor disk, and an equalizing area 21. By carefully designing the equalizing area 21 it is possible to provide full equalizing of the valve.

Figure 7:
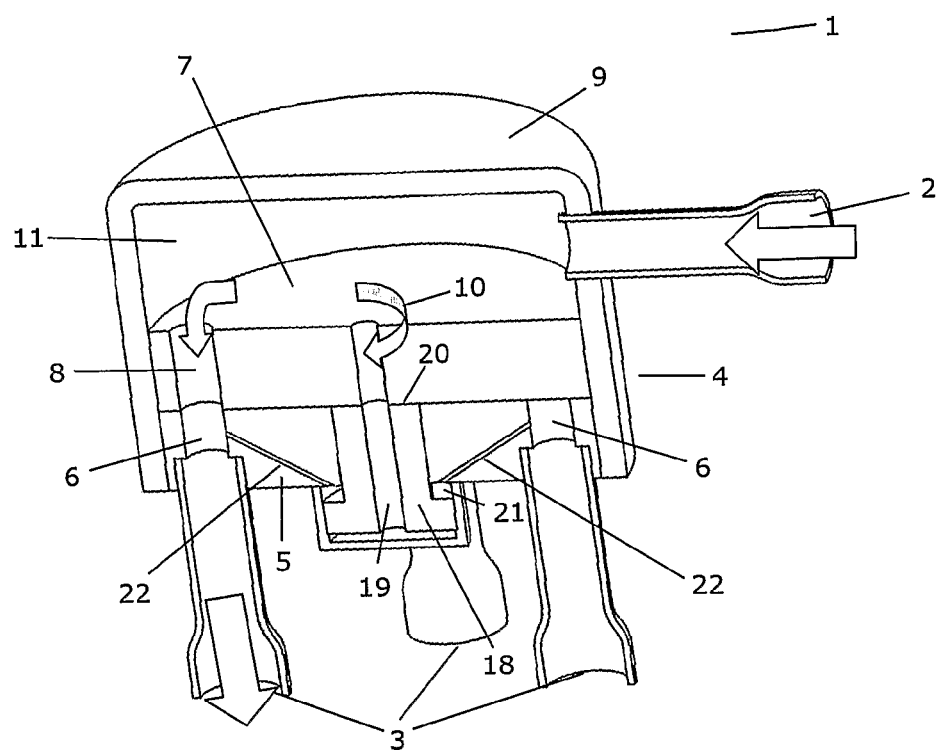
FIG. 7 is a cross sectional view of an expansion valve provided with the equalizing element of FIG. 6.

FIG. 7 is a perspective view of a cut through an expansion valve 1 according to an embodiment of the invention. The expansion valve 1 comprises a fixedly mounted orifice disk 5 and a distributor disk 7 arranged angularly movable relative to the orifice disk 5 as described above. The distributor disk 7 is of the kind comprising only a single opening 8. The orifice disk 5 is preferably of the kind shown in FIG. 5, even though the protrusions have been omitted for the sake of clarity.

A piston 18 of the kind shown in FIG. 6 is mounted on the distributor disk 7, the contact area 20 abutting the distributor disk 7. The equalizing channel 19 fluidly connects the back side of the piston 18 with the space 11. Accordingly, high pressure fluid medium is guided to the back side of the piston 18. Simultaneously, low pressure fluid medium is guided along channels 22 from the openings 6 towards a region above the equalizing area 21. Thus, high pressure fluid medium is guided to the back side of the piston 18 while low pressure fluid medium is guided to the region above the equalizing area 21, and this in combination causes the piston 18 to move in an upwards direction. Since the contact area 20 of the piston 18 is arranged in abutment with the distributor disk 7, the distributor disk 7 will thereby also be moved in an upwards direction, i.e. away from the orifice disk 5. As a consequence the resulting force pushing the disks 5, 7 towards each other is reduced, similarly to the situation described above with reference to FIG. 4. However, the magnitude of the counteracting force provided by the movements of the piston 18 is determined by the differential pressure, since the movements of the piston 18 are caused by the pressure of the fluid medium guided to the back side of the piston 18 and the region above the equalizing area 21, respectively. Thereby a dynamic equalization is provided, and it is possible to provide optimum equalization at all times during normal operation, i.e. it is possible to provide a variable counteracting force which matches the normal force. This is particularly the case if the area of the equalizing area 21 is designed to balance the areas of the sealing area 16 and the orifice area 17 shown in FIG. 5 to a desired degree, depending on the number of openings.

Figure 8:
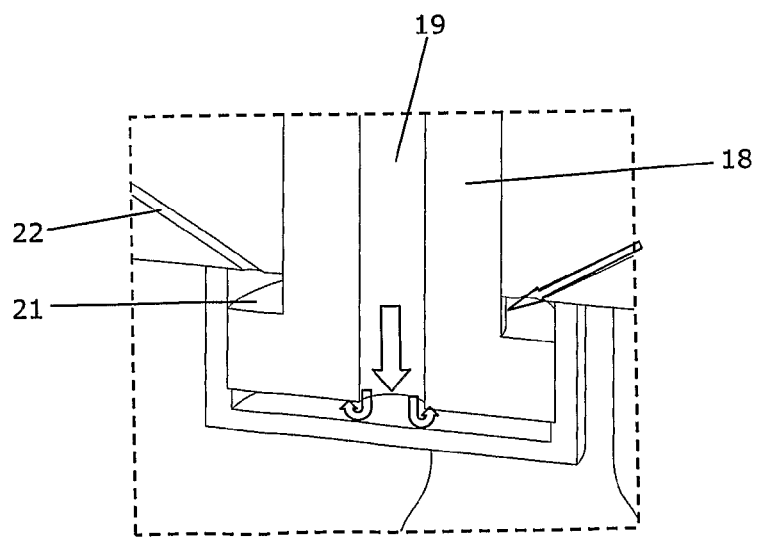
FIG. 8 is a detail of the expansion valve of FIG. 7.

FIG. 8 shows a detail of the expansion valve 1 of FIG. 7, illustrating the fluid flows around the piston 18, and how the fluid flows cause movement of the piston 18.

Figure 9:
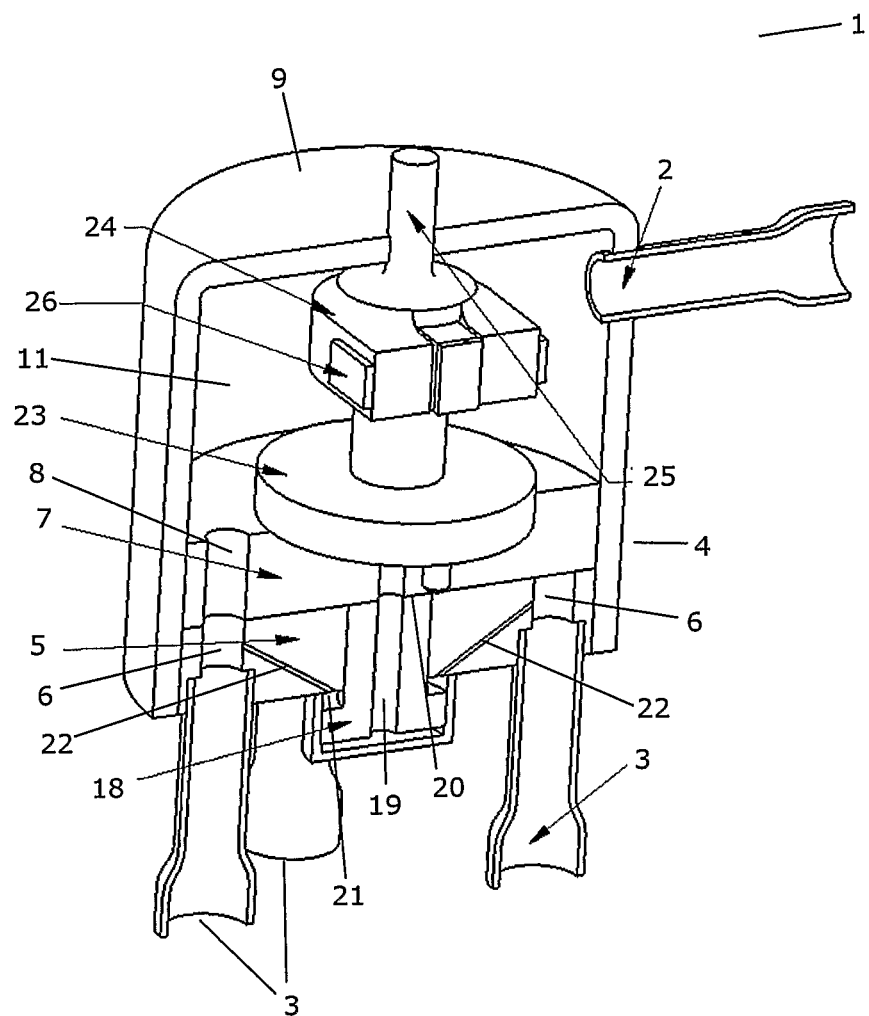
FIG. 9 is a perspective view of a cut through an expansion valve according to yet another embodiment of the invention.

FIG. 9 is a perspective view of a cut through an expansion valve 1 according to yet another embodiment of the invention.

The expansion valve 1 of FIG. 9 is similar to the expansion valve of FIG. 7 in that it also comprises a piston 18 used for providing dynamic equalization. The expansion valve 1 of FIG. 9 comprises a carrier 23 fixedly mounted on the distributor disk 7 and to an equalizing carrier 24 which is connected to an actuator shaft 25. The actuator shaft 25 is connected to an actuator (not shown). The equalizing carrier 24 is provided with two spring covers 25, each covering a spring and a valve arrangement (not shown). The valve arrangements are arranged to prevent fluid medium from entering the equalizing channel 19 when they are in a closed state, and to allow fluid medium to enter the equalizing channel 19 when they are in an open state. The precise function of the springs and valve arrangements will be described in further detail below with reference to FIG. 10.

When the distributor disk 7 is kept in a specific position, i.e. when it is not performing an angular movement relative to the orifice disk 5, the valve arrangements are in a closed state, thereby preventing fluid medium from entering the equalizing channel 19. Thereby the piston 18 is not able to provide equalization as described above. Accordingly, the distributor disk 7 is pressed firmly against the orifice disk 5, and the expansion valve 1 is therefore very tight.

When it is desired to rotate the distributor disk 7 in order to operate the expansion valve 1, the actuator (not shown) is operated, thereby causing rotation of the actuator shaft 25. The carrier 23 and the distributor disk 7 are rotated along. Rotation of the actuator shaft 25 furthermore causes operation of the valve arrangements (not shown) arranged inside the spring covers 26, thereby moving the valve arrangements into the open state. Thereby fluid medium is allowed to enter the equalizing channel 19, and the piston 18 provides equalization as described above. When rotation of the distributor disk 7 is no longer required, the actuator shaft 25 is no longer rotated, and the valve arrangements are returned to the closed state, thereby once again preventing fluid medium from entering the equalizing channel 19, and consequently preventing the piston 18 from providing equalization.

Thus, the expansion valve 1 of FIG. 9 can be operated with a low torque, due to the equalization provided by the piston 18. Simultaneously, the expansion valve 1 is very tight because the equalization only takes place during rotation of the distributor disk 7.

Thus, the expansion valve 1 of FIG. 9 can be operated with a low torque, due to the equalization provided by the piston 18. Simultaneously, the expansion valve 1 is very tight because the equalization only takes place during rotation of the distributor disk 7.

Thus, the expansion valve 1 of FIG. 9 can be operated with a low torque, due to the equalization provided by the piston 18. Simultaneously, the expansion valve 1 is very tight because the equalization only takes place during rotation of the distributor disk 7.

Figure 10:
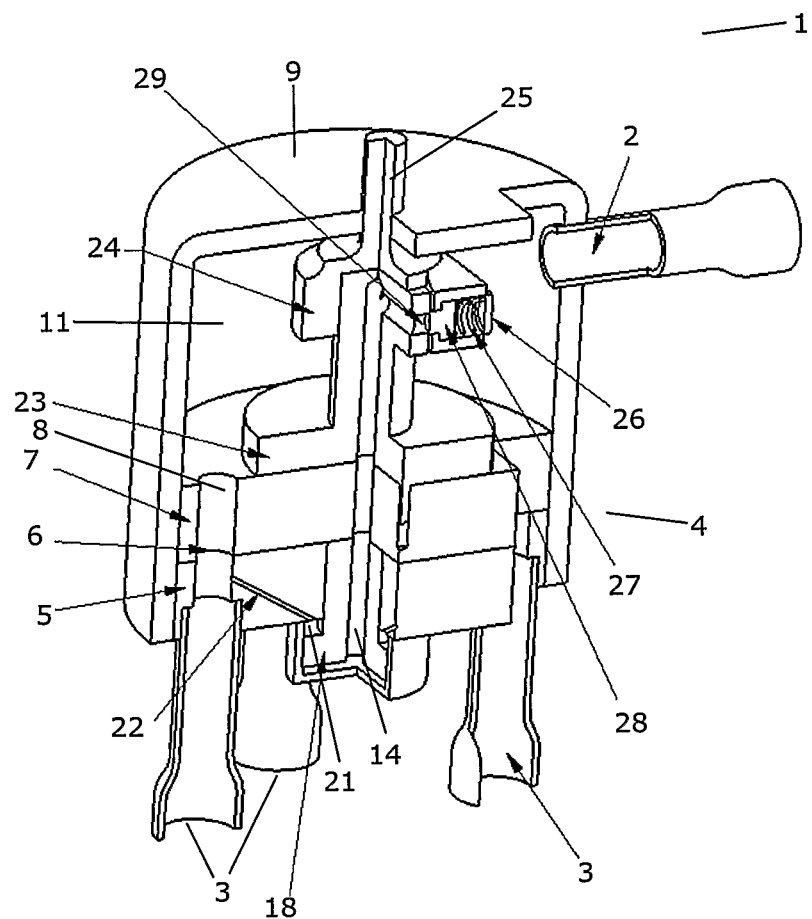
FIG. 10 is a cross sectional view of the expansion valve of FIG. 9, FIGS. 11a and 11b show a detail of the expansion valve of FIG. 10.

FIG. 10 is a perspective view of a cut through the expansion valve 1 of FIG. 9. In FIG. 10 the valve assembly inside the spring cover 26 is visible. A compression spring 27 is arranged to push a valve seat 28 in a direction towards a pilot nozzle 29. As a consequence the pilot nozzle 29 is normally closed, thereby preventing fluid medium from passing the pilot nozzle 29 and entering the equalizing channel 19. Rotation of the actuator shaft 25 causes it to push against the valve seat 28, thereby moving it against the spring force applied by the compression spring 27. Accordingly, the pilot nozzle 29 is opened, and fluid medium is allowed to pass the pilot nozzle 29 and enter the equalizing channel 19.

Figure 11A:
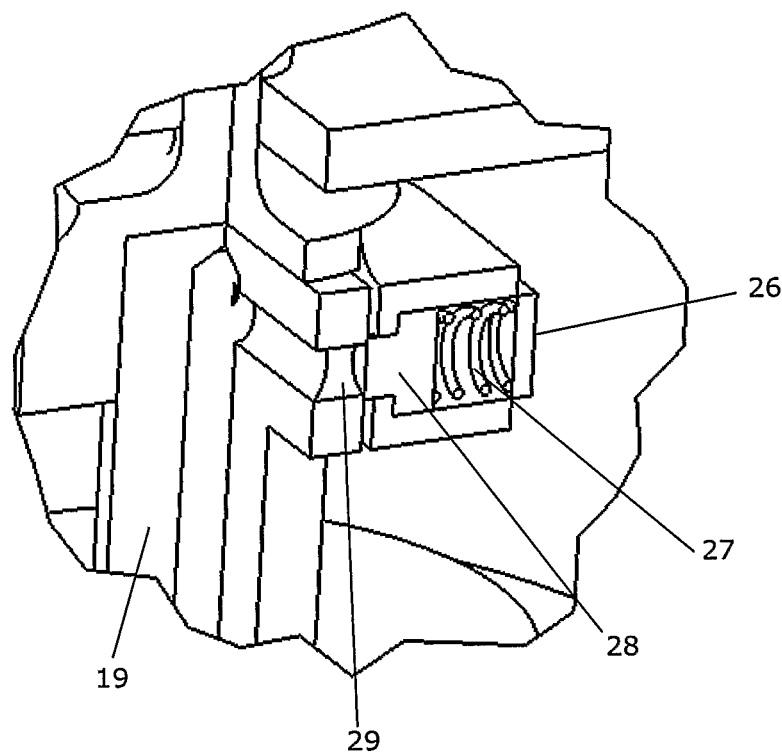
Figure 11B:
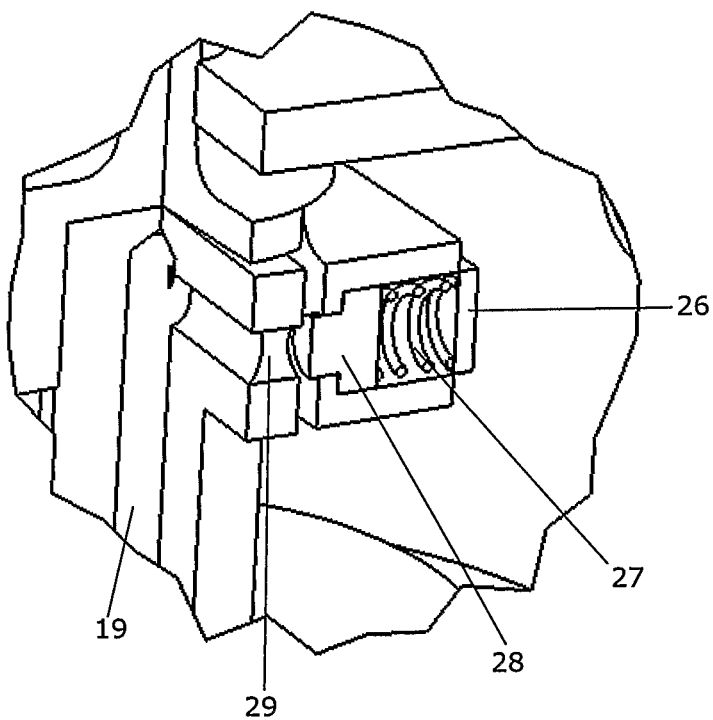

FIGS. 11a and 11b are details of FIG. 10 showing the valve assembly inside the spring cover 26. In FIG. 11a the valve seat 28 abuts the pilot nozzle 29, i.e. the valve assembly is in a closed state, preventing fluid medium from passing the pilot nozzle 29 and entering the equalizing channel 19. In FIG. 11b the valve seat 28 has been moved away from the pilot nozzle 29, i.e. the valve assembly is in an open state, allowing fluid medium to pass the pilot nozzle 29 and enter the equalizing channel 19.

Figure 12:
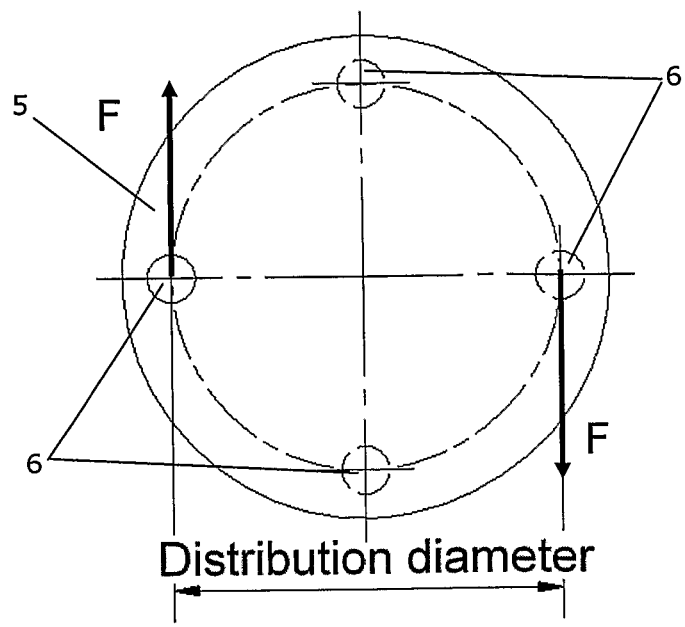
FIG. 12 is a schematic drawing illustrating forces acting when two disks are moved relative to each other.

FIG. 12 shows an orifice disk 5 having four substantially circular openings 6 formed therein. When the orifice disk 5 is rotated relative to a distributor disk (not shown), force couples illustrated by vector arrows F are acting as shown, i.e. forces acting on oppositely arranged openings 6 are of the same magnitude and directed in opposite direction. The distance between the centres of gravity of two oppositely arranged openings 6 is denoted the 'distribution diameter' or Dd. The magnitude of the force couples can be calculated as:

$$F = N_F \cdot \mu_{disk},$$

where $N_F$ is the normal force applied to the disks due to the differential pressure, and $\mu_{disk}$ is the friction factor of the disks.

The torque, T, required for rotating the orifice disk 5 and the distributor disk relative to each other depends on the force couple and can be calculated as:

$$T = F \cdot \frac{Dd}{2}.$$

It is clear from this equation that reducing the distribution diameter will reduce the required torque.

Figures 13A, 13B:
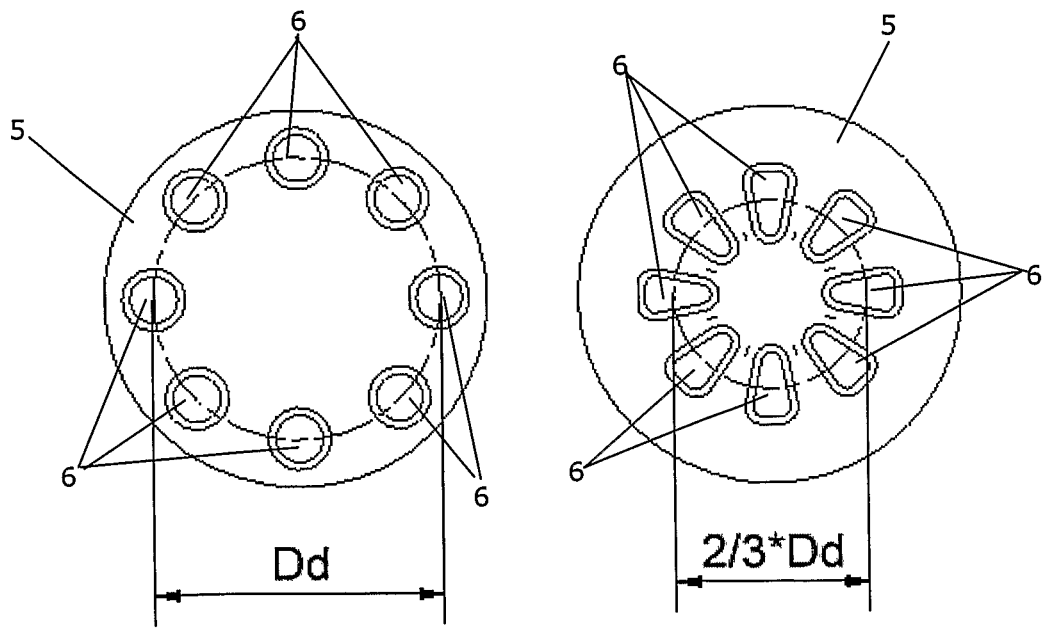
FIG. 13a shows a disk being provided with substantially circular openings.
FIG. 13b shows a disk being provided with openings having a tapered shape.

FIGS. 13a and 13b show two orifice disks 5, each being provided with eight openings 6. The area covered by each opening 6 is substantially identical. The openings 6 of the orifice disk 5 shown in FIG. 13a have a substantially circular shape. They are arranged at substantially equal distance from the centre of the orifice disk 5, and substantially equidistantly with respect to each other. The distance between the openings 6 and the centre of the orifice disk 5 is selected in such a manner that it is the smallest possible which allows the distance between two neighbouring openings 6 to be sufficiently large to allow an opening of a distributor disk to be accommodated there. Thus, a closed position of the expansion valve can be defined by a position where the opening(s) of the distributor disk is/are arranged at positions between the openings 6 of the orifice disk 5, i.e. there is no overlap between openings of the two disks. Accordingly, it is not possible to reduce the distribution diameter, Dd, in this design, if it is desired to be able to define a closed position of the expansion valve.

The openings 6 of the orifice disk 5 shown in FIG. 13b have a tapered shape. Thus, the transversal dimension of each opening decreases along a radial direction from the periphery of the orifice disk 5 towards the centre of the orifice disk 5. This shape allows the openings 6 to be moved closer to the centre of the orifice disk 5, while still allowing sufficient space between neighbouring openings 6 to allow an opening of a distributor disk to be accommodated there, i.e. it is still possible to define a closed position of the expansion valve.

As it appears from FIG. 13b, the distribution diameter, Dd, is reduced by a ⅓ as compared to the distribution diameter of the orifice disk 5 shown in FIG. 13a. Referring to the calculations described above, the torque, T, required for rotating the disks relative to each other is thereby also reduced by ⅓, given that the normal force acting on the disks due to the differential pressure and the friction factor of the disks are not changed.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An expansion valve comprising:
   an inlet opening adapted to receive fluid medium in a liquid state,
   at least one outlet opening adapted to deliver fluid medium in an at least partly gaseous state to at least one flow path,
   a first valve part and a second valve part arranged to be movable relative to each other in such a manner that the mutual position of the first valve part and the second valve part determines a fluid flow between the inlet opening and each of the outlet opening(s), said first and second valve parts each having at least one opening(s) formed therein, said first and second valve parts being arranged in such a manner that, during normal operation when the fluid medium in liquid state is received at the inlet opening of the expansion valve and when the fluid medium in the at least partly gaseous state is delivered at the outlet opening, a resulting force acts upon the first valve part and/or the second valve part, said resulting force pressing the first and second valve parts towards each other, and said resulting force resulting in friction between the first valve part and the second valve part, and means for biasing the first valve part and the second valve part in a direction away from each other, said biasing means resulting in reducing the resulting force acting upon the first valve part and/or the second valve part;
   wherein the opening(s) of the first valve part and the opening(s) of the second valve parts are arranged in such a manner that the openings of the first valve part and the second valve part can be arranged at least partly overlappingly; and
   wherein the mutual position of the first valve part and the second valve part determines the overlap of the opening(s) of the first valve part with the opening(s) of the second valve part.

2. The expansion valve according to claim 1, wherein the biasing means comprises means for adjusting at least one pressure occurring at or near the first valve part and/or the second valve part.

3. The expansion valve according to claim 2, wherein the first valve part and/or the second valve part is/are provided with at least one bypass opening allowing adaptation of a first pressure at a first side of the first/second valve part to a second pressure at a second side of the first/second valve part.

4. The expansion valve according to claim 1, further comprising an actuator adapted to cause relative movements of the first valve part and the second valve part, wherein the biasing means is operationally connected to the actuator in such a manner that the first valve part and the second valve part are biased in a direction away from each other in response to actuation of the actuator.

5. The expansion valve according to claim 4, wherein the biasing means comprises a pilot valve which is arranged to be opened in response to actuation of the actuator.

6. The expansion valve according to claim 1, wherein the means for reducing the resulting force is at least partly integrated in the first valve part and the second valve part.

7. The expansion valve according to claim 6, wherein the first valve part and/or the second valve part is/are provided with one or more recesses and one or more projections, thereby reducing a contact area between the first valve part and the second valve part.

8. The expansion valve according to claim 1, wherein the first valve part and the second valve part are adapted to perform substantially linear movements relative to each other.

9. The expansion valve according to claim 1, wherein the first valve part and the second valve part are adapted to perform substantially rotational relative movements.

10. The expansion valve according to claim 9, wherein the first valve part comprises a first disk, and the second valve part comprises a second disk, the first disk and/or the second disk being arranged to perform rotational movements relative to the other disk, wherein each of the opening(s) of the first disk is fluidly connected to an outlet opening.

11. The expansion valve according to claim 10, wherein the number of openings formed in the second disk is equal to the number of openings of the first disk.

12. The expansion valve according to claim 10, wherein the second disk has only one opening formed therein.

13. The expansion valve according to claim 10, wherein at least one of the opening(s) of the first disk and/or the opening(s) of the second disk has a tapered shape defining a smaller size along a circumferential direction at an end facing towards the centre of the first/second disk than a size along a circumferential direction at an end facing towards the periphery of the first/second disk.

14. The expansion valve according to claim 1, further comprising an actuator adapted to cause relative movements of the first valve part and the second valve part.

15. The expansion valve according to claim 1, further comprising:
   a distributor comprising an inlet part fluidly connected to the inlet opening, the distributor being arranged to distribute fluid medium received from the inlet opening to at least two parallel flow paths, and
   at least two outlet openings, each being adapted to deliver fluid medium in an at least partly gaseous state, each of the outlet openings being fluidly connected to one of the parallel flow paths.

16. The expansion valve according to claim 15, wherein the first valve part and/or the second valve part forms part of the distributor.

17. The expansion valve according to claim 15, wherein the mutual position of the first valve part and the second valve part determines a distribution of fluid among the outlet openings.

18. The expansion valve according to claim 1, wherein the mutual position of the first valve part and the second valve part determines an opening degree of the expansion valve.

19. The expansion valve according to claim 1, wherein the fluid medium is a refrigerant.

20. A refrigeration system comprising:
   at least one compressor,
   at least one condenser,
   at least one evaporator, and
   an expansion valve according to claim 1, said expansion valve being arranged in such a manner that the outlet opening is arranged to deliver refrigerant to the evaporator.

* * * * *

UNITED STATES PATENT AND TRADEMARK OFFICE
CERTIFICATE OF CORRECTION

| | | |
|---|---|---|
| PATENT NO. | : 9,109,824 B2 | Page 1 of 1 |
| APPLICATION NO. | : 13/062089 | |
| DATED | : August 18, 2015 | |
| INVENTOR(S) | : Jens Pawlik et al. | |

It is certified that error appears in the above-identified patent and that said Letters Patent is hereby corrected as shown below:

In the Claims:

Claim 6, Column 13, line 63, please delete "and" and substitute with --and/or--.

Claim 7, Column 14, line 1, please delete "and" and substitute with --and/or--.

Signed and Sealed this
First Day of March, 2016

Michelle K. Lee
*Director of the United States Patent and Trademark Office*